(12) United States Patent
Haupt

(10) Patent No.: US 9,109,611 B2
(45) Date of Patent: Aug. 18, 2015

(54) DEVICE FOR STORING HYDRAULIC FLUID

(71) Applicant: ZF Friedrichshafen AG, Friedrichshafen (DE)

(72) Inventor: Josef Haupt, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 265 days.

(21) Appl. No.: 13/650,184

(22) Filed: Oct. 12, 2012

(65) Prior Publication Data
US 2013/0092273 A1    Apr. 18, 2013

(30) Foreign Application Priority Data

Oct. 13, 2011 (DE) .......................... 10 2011 084 389
Mar. 1, 2012 (DE) .......................... 10 2012 203 185

(51) Int. Cl.
*B67D 7/24* (2010.01)
*F15B 1/04* (2006.01)
*F16H 61/00* (2006.01)

(52) U.S. Cl.
CPC .............. *F15B 1/04* (2013.01); *F16H 61/0025* (2013.01); *F15B 2201/21* (2013.01); *F15B 2201/31* (2013.01); *F15B 2201/40* (2013.01); *F15B 2201/411* (2013.01); *F16H 2061/0034* (2013.01)

(58) Field of Classification Search
CPC ..... F15B 2201/21; F15B 1/04; F16H 61/0025
USPC .................................... 138/31, 30; 188/106 F
See application file for complete search history.

(56) References Cited

U.S. PATENT DOCUMENTS

| 3,467,140 A * | 9/1969 | Hanson ........................... 138/31 |
| 4,000,758 A * | 1/1977 | Meisenheimer, Jr. ........... 138/31 |
| 4,207,563 A * | 6/1980 | Soupal .......................... 340/626 |
| 8,371,336 B2 * | 2/2013 | Nakaoka et al. ................ 138/30 |
| 2008/0060862 A1* | 3/2008 | Schiele et al. ................. 180/165 |
| 2010/0206389 A1* | 8/2010 | Kennedy et al. ................ 137/14 |
| 2012/0085450 A1* | 4/2012 | Marin et al. .................... 138/31 |
| 2012/0168265 A1* | 7/2012 | Mahnkopf ................. 188/106 P |

FOREIGN PATENT DOCUMENTS

| DE | WO2011009659 A1 * | 1/2011 | ............... B60T 8/26 |
| WO | 2007/118500 A1 | 10/2007 | |

* cited by examiner

Primary Examiner — Paul R Durand
Assistant Examiner — Jeremy W Carroll
(74) Attorney, Agent, or Firm — Davis & Bujold, P.L.L.C.; Michael J. Bujold

(57) ABSTRACT

A device for storing fluid, of a transmission hydraulic system, having at least one storage chamber that is defined by a housing and a delimiting device, which can be connected with the hydraulic system. The volume of the chamber depends on operation of the delimiting device and/or the housing. The delimiting device and/or housing can be set such that the storage chamber has a defined volume, in opposition to a restoring effort of the housing and/or delimiting device, starting from an operating condition which differs from the operating condition equivalent to the minimum volume of the storage chamber toward their operating condition equivalent to the minimum storage chamber volume. When the holding device is actuated, the operating conditions of the delimiting device and/or the housing assembly vary between operating conditions in which the storage chamber volume is either a maximum or corresponds to the defined storage chamber volume.

17 Claims, 14 Drawing Sheets

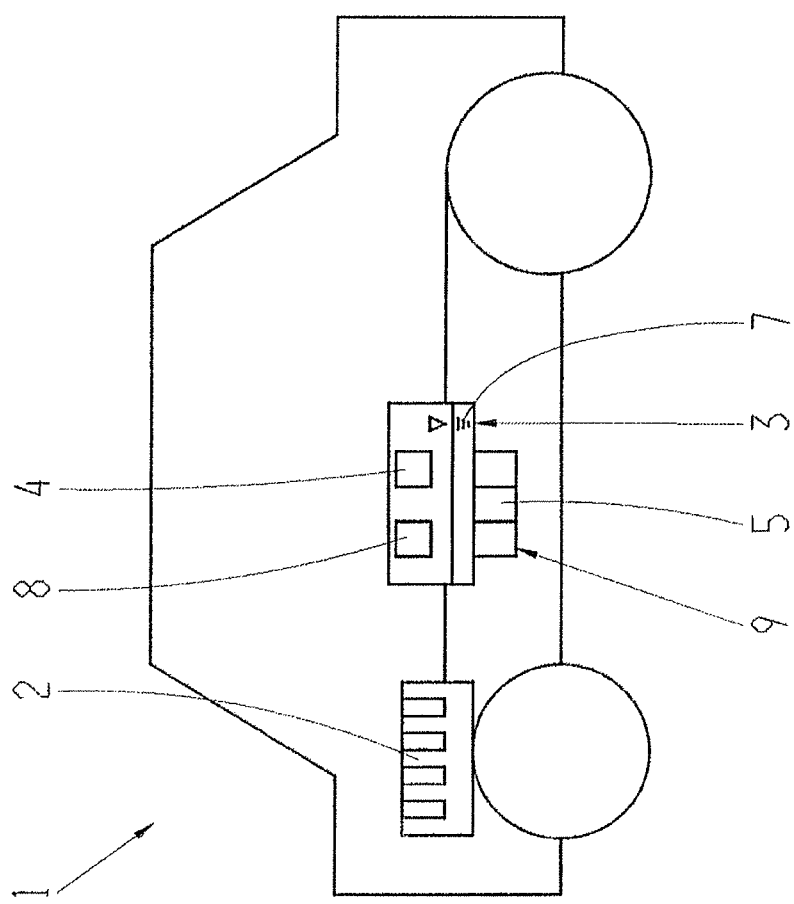

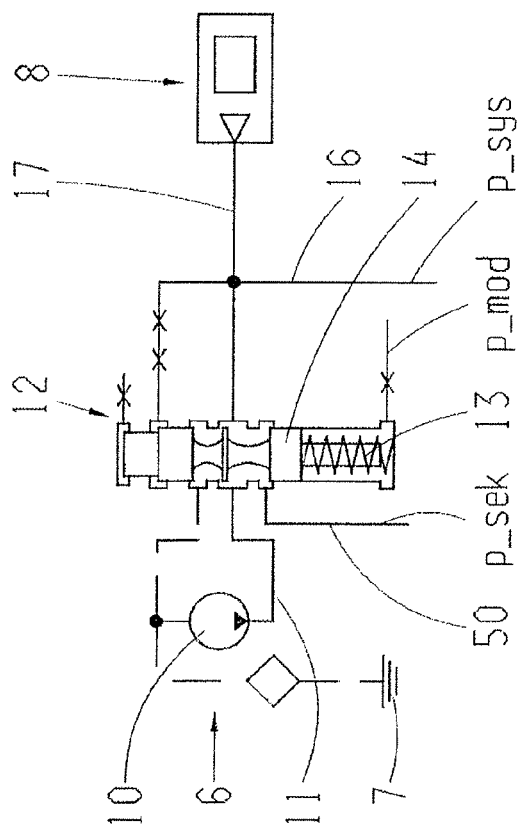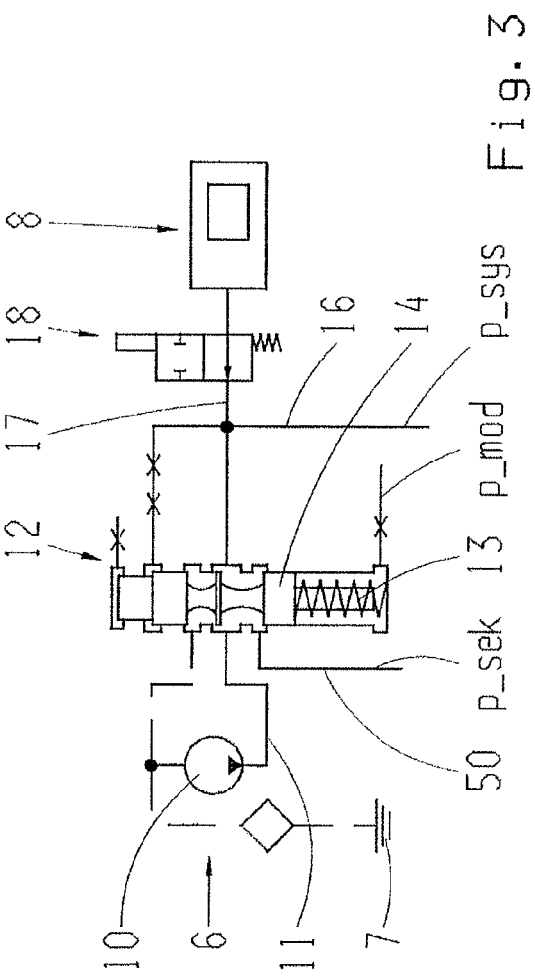

DEVICE FOR STORING HYDRAULIC FLUID

This application claims priority from German patent application serial no. 10 2012 203 185.5 filed Mar. 1, 2012 and German patent application serial no. 10 2011 084 389.2 filed Oct. 13, 2011.

FIELD OF THE INVENTION

The invention concerns a device for storing hydraulic fluid.

BACKGROUND OF THE INVENTION

WO 2007/118500 A1 describes a device for storing hydraulic fluid of a hydraulic system of a transmission device, which has at least one storage chamber that is delimited by a housing assembly and a delimiting device and which can be brought into functional connection with a hydraulic system for exchanging hydraulic fluid, the volume of the storage chamber being variable between a minimum and a maximum depending on the operating condition of the delimiting device and/or that of the housing assembly. The delimiting device and/or the housing are held by a holding device at least in the operating condition that is equivalent to the maximum volume of the storage chamber, in opposition to a restoring effort of the housing assembly and/or the delimiting device which, starting from an operating condition which differs from the operating condition that is equivalent to the minimum volume of the storage chamber, is directed toward its operating condition equivalent to the minimum volume of the storage chamber.

The device, which comprises a pulse store, is combined with a transmission device in order to bring, during a motor start, the transmission device within desired operating times to an operating condition in which the shifting elements to be engaged, in order to produce a required operating condition of the transmission device, such as clutches and/or brakes as well as a hydraulic control unit, are supplied with hydraulic fluid to an extent necessary for this. During this a transmission pump that can be driven by the motor, in combination with the device, is capable of producing in the area of the clutches and/or brakes a desired operating condition or a frictional engagement. Without the hydraulic fluid volume stored in the area of the device, the shifting elements and the hydraulic control unit of the transmission device are only after the lapse of longer operating times filled to the desired extent or supplied with the necessary hydraulic fluid volume.

To be able to further reduce the consumption of energy of the drive machines of vehicles, for example the power uptake of such a transmission pump of a transmission device can be reduced by making the transmission pump smaller. However, a smaller transmission pump is in some circumstances problematic, if shifts, at low rotational speeds of the drive machine, can only be assisted insufficiently by the smaller transmission pump, since such transmission pumps cannot then deliver enough hydraulic fluid to make up for transmission leaks and fill the shifting elements to be actuated. Examples of critical shifts are engaging a gear while the vehicle is stationary, or so-termed roll-off shifts.

In order to make available a sufficient hydraulic fluid volume, even during the above-described supply-critical operating condition situations, for example a further, spring-loaded hydraulic fluid volume store can be used by means of which, if critical operating conditions occur, a stored hydraulic fluid volume can be delivered to the hydraulic system in addition to the hydraulic fluid volume provided by the transmission pump. However, such a further hydraulic store takes up additional space and considerably increases the manufacturing costs of a transmission device.

The device known from WO 2007/118500 A1, also comprising a spring-force-actuated hydraulic store that can be triggered by an electrical detent system, delivers a hydraulic volume pulse during a drive machine starting process to the hydraulic system of a transmission device and thereby assists with the filling of the shifting elements being shifted for the required frictional connections. In principle the known device and its store can also be used during the normal operation of a vehicle's drive-train to assist shifts, during which the electrical detent or holding device is deactivated. However, with such actuation of the device, during a start of a drive machine there is no guarantee that the device will provide a desired hydraulic fluid volume, since it is necessary to have a correspondingly full store to meet that requirement in any and all operating conditions of a transmission device or vehicle drive-train. This means that by way of the device known from the prior art, either only a start can be assisted, or for example, shift assistance is possible during normal operation.

SUMMARY OF THE INVENTION

Accordingly, the purpose of the present invention is to provide a compact and inexpensive device for storing hydraulic fluid of a hydraulic system of a transmission device, by means of which during critical operating condition situations of a transmission device, additional hydraulic fluid volume can be provided to such an extent that a transmission pump with low power uptake can be used.

In the device according to the invention for storing hydraulic fluid of a hydraulic system of a transmission device with at least one storage chamber which is delimited by a housing assembly and a delimiting device and can be brought into functional connection with the hydraulic system for the exchange of hydraulic fluid, the volume of the storage chamber can be varied between a maximum and a minimum as a function of an operating condition of the delimiting device and/or the housing assembly. The delimiting device and/or the housing assembly can be held by a holding device in an operating condition equivalent to a defined value of the volume of the storage chamber, in opposition to a restoring effort of the housing assembly and/or the delimiting device, starting from an operating condition that differs from the operating condition that is equivalent to the minimum volume of the storage chamber and directed toward its operating condition that is equivalent to the minimum volume of the storage chamber.

According to the invention, when the holding device is activated the operating conditions of the delimiting device and/or the housing assembly vary as a function of a pressure in the hydraulic system and their restoring effort, in each case in an operating condition range between two limiting operating conditions in which the volume of the storage chamber is either at a maximum, or corresponds to the defined value of the volume of the storage chamber.

Compared with the device known from the prior art, the device according to the invention is modified in such a manner that by means of the device a hydraulic fluid volume can still be provided during a starting process of a drive machine and in addition, during critical operating condition situations such as during a gear engagement while the vehicle is at rest or during roll-away shifts, a transmission pump in the undersupplying range can be assisted with an additional hydraulic fluid volume.

This means that in the area of the device according to the invention the defined value of the volume of the storage chamber constitutes the hydraulic fluid volume that can be provided in addition to the delivery volume of a transmission pump during the starting process of the drive machine, while the further hydraulic fluid volume, which in the operating condition range between two limiting operating conditions of the delimiting device and/or the housing assembly, is stored in the device in the area of the storage chamber in addition to the defined value of the volume of the storage chamber, is expelled out of the device in the direction of the hydraulic system during critical operating condition situations.

Thus, the device according to the invention constitutes a combined hydraulic store, which during the operation of a transmission device constantly provides the hydraulic fluid volume for the so-termed starting pulse, and also, can at any time deliver hydraulic fluid volume to the hydraulic system as necessary if a transmission pump is working in the deficient supply range and the pressure in the hydraulic system, in particular during a gearshift, would otherwise fall in the hydraulic system below a supply pressure level or would collapse. Thus, a transmission pump of a transmission device made with the device according to the invention can be used at a lower delivery volume and also, therefore, with lower power uptake.

In a simply designed and inexpensive embodiment of the device according to the invention, the delimiting device comprises a piston element that is designed to move in opposition to the spring force of a spring arrangement in the housing assembly, starting from a position that is equivalent to the minimum volume of the storage chamber toward the maximum volume of the storage chamber, such that the piston can be held by the holding device in a position that is equivalent to the defined value of the volume of the storage chamber against the spring force of the spring arrangement.

In this embodiment, the piston element of the delimiting device is designed to move, in opposition to a spring force of the spring arrangement, starting from a position that is equivalent to the minimum volume of the storage chamber to a position that is equivalent to the defined value of the volume of the storage chamber and beyond, depending on the pressure in the hydraulic system. The defined value of the volume of the storage chamber constitutes the hydraulic fluid volume for the additional supply of the hydraulic system during a drive machine starting process, while the hydraulic fluid volume stored over and above that in the device or its storage chamber, meaning the difference between the defined value of the storage chamber volume and the maximum volume of the storage chamber, can be delivered to the hydraulic system to support the latter during critical operating condition situations during which insufficient hydraulic fluid volume flow is provided by a transmission pump. In such a case, the piston element or its displacement path undergoes a so-termed overrun which extends, starting from the position of the piston element in which the piston element can be held by the activated detent device against the restoring effort, in the direction toward the position of the piston element that is equivalent to the maximum storage volume of the storage chamber.

If the delimiting device comprises two piston elements, each designed to be able to move in opposition to a respective spring force of a spring arrangement in the housing assembly, in each case starting from a position that is equivalent to the minimum storage chamber volume toward the maximum storage chamber volume, such that at least one of the piston elements can be held by the holding device in a position that is equivalent to the defined value of the storage chamber volume against the spring force of the spring arrangement, in a simple manner this makes it possible to assist a transmission pump both during a drive machine starting process and also during unfavorable operating condition situations of a transmission device, by delivering stored hydraulic fluid into the hydraulic system. Examples of unfavorable operating condition situations are gear engagement processes when the drive machine is running at idling speed, or coasting shifts, during which in each case only very low supply pressures can be provided by a transmission pump.

In this case, a displacement characteristic of the device, i.e. the pressure in the hydraulic system that can be produced by the introduction of hydraulic fluid into the hydraulic system over the operating time, during the drive machine starting process and during unfavorable operating condition situations, can be established by a correspondingly soft design of a spring arrangement associated with one of the piston elements independently of a preferably stiff design of a spring arrangement associated with the other piston element.

In a space-saving further development of the device according to the invention, the piston elements are positioned coaxially relative to one another with one piston element being arranged to move longitudinally at least partially inside the other piston element.

If the outer (first) piston element and the inner (second) piston element are each acted upon by a spring force of a spring arrangement exerted in the direction of a piston element position that is equivalent to the minimum storage chamber volume, such that the spring characteristic of the spring arrangement associated with the inner (second) piston element is smaller than the spring characteristic of the spring arrangement associated with the outer (first) piston element, then the mode of action of the device according to the invention can be adapted particularly simply to the application case existing at the time.

In a simply designed and easily assembled embodiment of the device according to the invention, the outer piston element is supported by its associated spring arrangement against the housing assembly.

Alternatively to or cumulatively with this, the inner (second) piston element is supported by its associated spring arrangement against the outer (first) piston element or against the housing assembly, in order to produce the device according to the invention in a simply designed manner with little effort.

If the inner (second) piston element is at least in part formed at least approximately as a hollow cylinder, then hydraulic fluid can be stored in the inside space delimited by the inner (second) piston element and the device can be made in a space-saving manner with smaller outer (first) piston element dimensions.

If a further storage chamber delimited by the outer (first) piston element and the inner (second) piston element, which is separate from the primary storage chamber, can be connected by way of a valve unit to a hydraulic fluid reservoir, then a displacement characteristic of the device according to the invention can be adapted with a desired degree of freedom, by virtue of an appropriate design and/or an appropriate valve characteristic of the valve unit, to the application case existing at the time.

In a further development of the device, according to the invention, that can be operated with little effort, the valve unit is in the form of a one-way throttle valve having a flow cross-section between the further storage chamber and the hydraulic fluid reservoir that varies as a function of a pressure in the further storage chamber. In this way the displacement characteristic of the device according to the invention can be defined without additional control and regulation complexity, as a function of the pressure in the further storage chamber.

In a further embodiment of the device according to the invention, the displacement characteristic of the device according to the invention is characterized in that the further storage chamber, at least in the position of the outer (first) piston element equivalent to the defined storage chamber volume, is connected by way of the valve unit to the hydraulic fluid reservoir, whereas in positions of the outer (first) piston element which are equivalent to storage volumes of the storage chamber smaller than the defined storage chamber volume, the further storage chamber is cut off from the hydraulic reservoir.

This ensures that when the holding device is detaining preferably the outer piston element, by virtue of which the hydraulic fluid volume, provided for supporting the transmission pump during a drive machine starting process, is delivered to the hydraulic system by corresponding movement of the piston element, then in relation to the preferably outer (first) piston element, possible relative movements of the preferably inner (second) piston element are not interfered with by corresponding pressure fluctuations in the further storage chamber.

If the further storage chamber can be connected, via a further valve unit, to the primary storage chamber, then compared with the device known from the prior art the device can be made with essentially the same outer (first) dimensions and, for assisting a start, essentially the same hydraulic fluid volume as by the known device can be provided, so that the hydraulic fluid volume required, for example to assist shifting, can additionally be delivered by the device according to the invention with the same outer (first) dimensions.

If the further valve unit is designed as a one-way valve with defined response limits and, if a defined pressure level in the further storage chamber is exceeded, the further storage chamber is connected by the further valve unit to the primary storage chamber, then the oil volume present inside the inner (second) piston element is delivered from the further storage chamber toward the primary storage chamber and thus also toward the hydraulic system during the course of relative movement between the outer (first) piston element and the inner (second) piston element during which the volume of the further storage chamber is reduced. This design of the device according to the invention can be operated with little control and regulation effort and, compared with the device known from the prior art, it can be made so that it occupies essentially the same amount of space.

If the storage chamber is connected to the hydraulic system by a one-way throttle valve which, when the pressure in the hydraulic system is such that the storage chamber is filled with hydraulic fluid in opposition to the restoring effort of the housing assembly and/or the delimiting device, leaves open a smaller flow cross-section than when the pressure in the hydraulic system is such that, due to the restoring effort of the housing assembly and/or the delimiting device, hydraulic fluid is pushed out of the storage chamber toward the hydraulic system, then the hydraulic system can be supplied with hydraulic fluid by means of the device according to the invention within short operating times. The filling or priming of the device according to the invention with hydraulic fluid from the hydraulic system, particularly during a start-up operating phase of a transmission pump, takes place by way of a smaller flow cross-section in the area of the one-way throttle valve. Thus, supplying the hydraulic system by means of the transmission pump is given greater priority relative to filling the device, and is not interfered with by the filling of the device.

If a switchable blocking valve is provided between the storage chamber and the hydraulic system, then the action of the device according to the invention can be switched on or off by correspondingly actuating the blocking valve.

The characteristics indicated in the following example embodiments of the device according to the invention are suitable, either considered in isolation or in any combination with one another, as further developments of the object according to the invention. In relation to the further development of the object of the invention, the respective combinations of characteristics have no restrictive force but are presented essentially only as examples.

BRIEF DESCRIPTION OF THE DRAWINGS

Further advantages and advantageous features of the device according to the invention emerge from the example embodiments whose principle is described with reference to the drawings. For the sake of clarity, in the description of the various example embodiments the same indexes are used for components having the same structure and function.

The drawings show:

FIG. 1: A very schematic representation of a vehicle made with a vehicle transmission and a device according to the invention;

FIG. 2: A partial representation of a hydraulic system of the vehicle transmission connected to the device according to the invention;

FIG. 3: A representation similar to FIG. 2, of a further embodiment of the hydraulic system of the vehicle transmission;

DETAILED DESCRIPTION OF THE PREFERRED EMBODIMENTS

Figure 4:
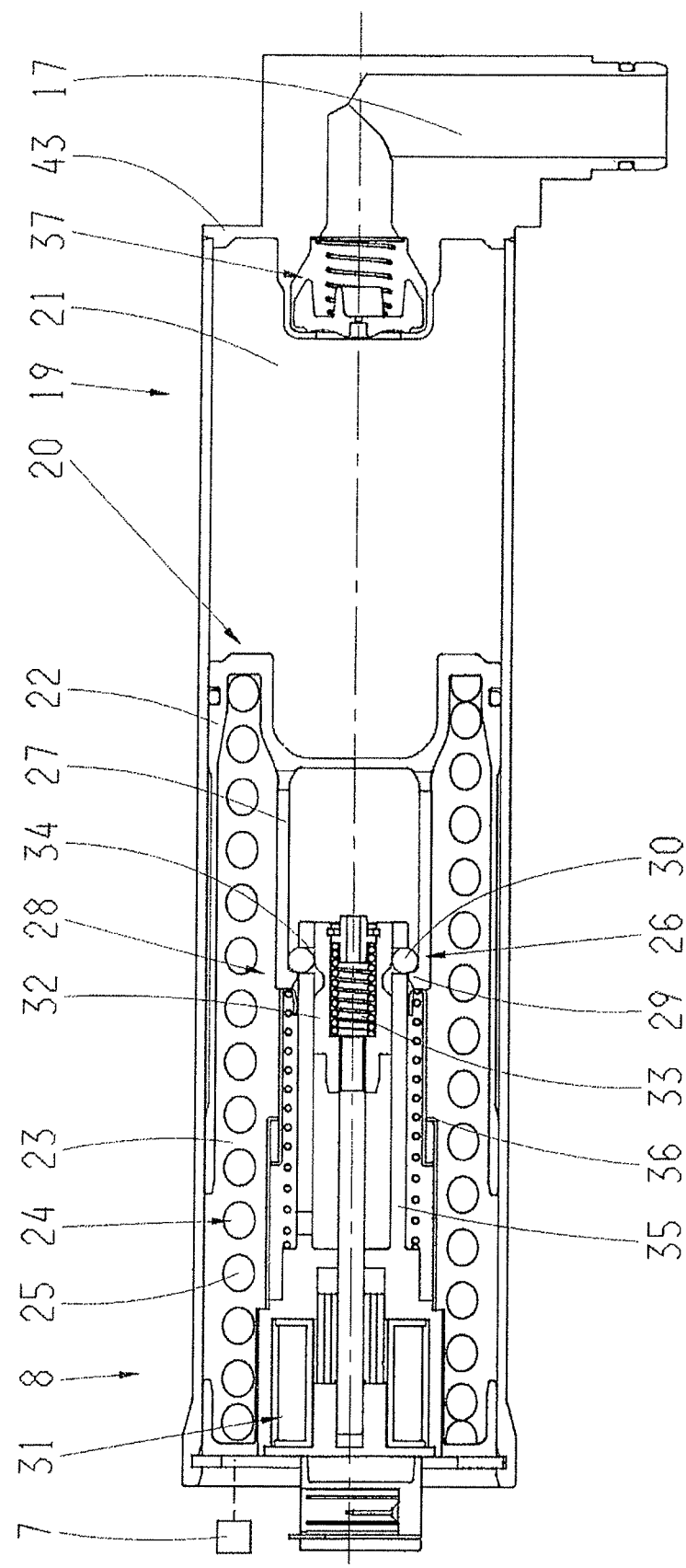
FIG. 4: A very schematic longitudinal sectional view of a first example embodiment of the device according to the invention, wherein a delimiting device of the device is in an operating condition in which a volume of a storage chamber has a predefined value.

FIG. 1 shows a very schematic representation of a vehicle 1, which in a manner known per se is made with an internal combustion engine 2 and a transmission device 3. The transmission device can basically be any automated manual shift transmission or automatic transmission known from practice, which is made with hydraulically controlled shifting elements 4, 5 such as frictional disk clutches or disk brakes.

In this case the transmission device 3 or rather vehicle transmission is formed with a hydraulic system 6, as represented very schematically in FIG. 2 or 3, with an oil sump 7 and a device 8 for storing hydraulic fluid of the hydraulic system 6 of the transmission device 3, wherein as shown in FIG. 1 the device 8 is arranged in a hydraulic shifting unit 9 of the vehicle transmission 3.

To optimize fuel consumption and reduce pollutant emissions from the vehicle 1, a so-termed motor-start-stop function is provided, by means of which in predefined operating conditions of the vehicle 1, the combustion engine 2 is stopped and then re-started when one or more start criteria are met.

In this case, the hydraulic system 6 comprises a hydraulic pump 10 that is powered by the combustion engine 2. Accordingly, the delivery volume of the hydraulic pump 10 depends on the running speed of the combustion engine 2. A pressure side 11 of the hydraulic pump 10 is connected to a system pressure valve 12 in the area of which a system pressure $p\_sys$ is set as a function of a spring force of a spring arrangement 13, a modulation pressure $p\_mod$ that can be applied to the valve slide 14 of the system pressure valve 12, and a restoring surface 15 of the valve slide 14 to which the system pressure $p\_sys$ is applied. On exceeding a pressure level of the system pressure $p\_sys$ determined by the modulation pressure $p\_mod$, saturation takes place in a primary pressure circuit 16 of the hydraulic system 6 and the hydraulic fluid volume delivered by the hydraulic pump 10 is partially diverted toward a secondary pressure circuit 50, in which a secondary pressure $p\_sek$ is then present.

In the present case, the shifting elements 4 and 5 of the transmission device 3 are supplied with hydraulic fluid via the primary pressure circuit 16 of the hydraulic system 6 when these have to be changed to a closed or engaged operating condition so as to produce a required operating condition of the transmission device.

In this, however, it is problematic that to achieve a high overall efficiency of the transmission device 3, the hydraulic pump 10 is made with the lowest possible delivery power and thus a low pump power uptake, and when the combustion engine is driving the hydraulic pump 10 at low speeds, the primary pressure circuit 16 cannot be supplied by the hydraulic pump 10 with the hydraulic fluid volume flow that is needed to produce the operating condition of the transmission device 3 required at the time.

For that reason the device 8 according to the invention is connected to the primary pressure circuit 16 in the area of a hydraulic line 17, and this hydraulic line 17 of the hydraulic system in FIG. 2 is open throughout the operating range of the transmission device 3, whereas in the design of the hydraulic system 6 shown in FIG. 3 the hydraulic line 17 can be blocked by means of a switchable blocking valve 18 depending on the operating condition of the transmission device 3 at the time, so that the action mode of the device 8 to be described in detail below can be switched on or off.

A first example embodiment of the device 8 for storing hydraulic fluid of the hydraulic system 6 of the transmission device 3 is shown as a detailed longitudinal sectional view in FIG. 4. The device 8 comprises a housing assembly 19 and a delimiting device 20, which delimit a storage chamber 21 of the device 8 that can be connected to the hydraulic system by way of the hydraulic line 17. The volume of the storage chamber 21 varies between a minimum and a maximum as a function of an operating condition of the delimiting device 20 and in this case the delimiting device 20 comprises a piston element 22 arranged to move longitudinally between two end positions in the housing assembly 19, which is made at least in part as a cylinder. The volume of the storage chamber 21 is always limited by the piston element 22 and a cylindrical part of the housing assembly 19, so that during movement of the piston element 22 toward its first end position, the volume of the storage chamber 21 decreases and during movement toward its second end position, the volume increases.

Furthermore, on the side of the piston element 22 facing away from the storage chamber 21, inside the housing assembly 19 the piston element 22 and the housing assembly 19 delimit a space 23 in which a spring arrangement 24 is accommodated. To avoid a pressure build-up which would impede the action mode of the device 8, the space 23 is connected to a substantially unpressurized hydraulic fluid reservoir, i.e. in this case the oil sump 7. In the present case the spring arrangement 24 comprises a spring element 25 in the form of a spiral spring, which rests at one end against the end face of the piston element 22 facing away from the storage chamber 21 and made in part as a hollow cylinder, and at the other end against an end face of the housing assembly 19, the spring acting as a compression spring during the operation of the device 8.

In addition a holding device 26 is provided in the space 23, by means of which the delimiting device 20 or its piston element 22 can be held in an operating condition equivalent to a defined value of the volume of the storage chamber 21 in opposition to a restoring effort imposed on the piston element 22 by the spring element 25, starting from an operating condition that differs from the operating condition equivalent to the minimum volume of the storage chamber 21, in the direction toward the operating condition equivalent to the minimum volume of the storage chamber 21, or its first end position.

In this case the holding device 26 is accommodated completely in the space 23 in the housing assembly 19. In the area of its side facing toward the space 23, the piston element 22 is made with a holding section 27 which, in an end area 28, is formed with a detent area 29 that projects radially inward. The detent area 29 of the holding section 27 co-operates, in the manner shown in FIG. 4, with preferably bell-shaped blocking elements 30 of the holding device 26 in such manner that when the pressure in the storage chamber 21 is sufficient, the piston element 22 is pushed by the spring arrangement 24 in the direction toward its first end position until the detent area 29, when the holding device 26 is activated, comes in contact with the blocking elements 30 so that any further axial displacement of the piston element 22 is prevented by the blocking elements 30.

For this purpose the holding device 26 is constructed with an actuating tappet 32 which activates the holding device 26 when an electromagnetic actuator 31 is energized, and the tappet, in the area of its end facing toward the piston element 22, is spring-loaded by a further spring arrangement 33 in the direction of a position in which the holding device 26 is deactivated and, when the electromagnetic actuator 31 is energized, presses the blocking elements 30 against the spring force of the further spring arrangement 33, with its side facing toward the piston element, radially outward into an annular groove 34 so that in the manner shown in detail in FIG. 4, the piston element 22 is held in opposition to the spring force of the spring arrangement 24.

Figure 5:
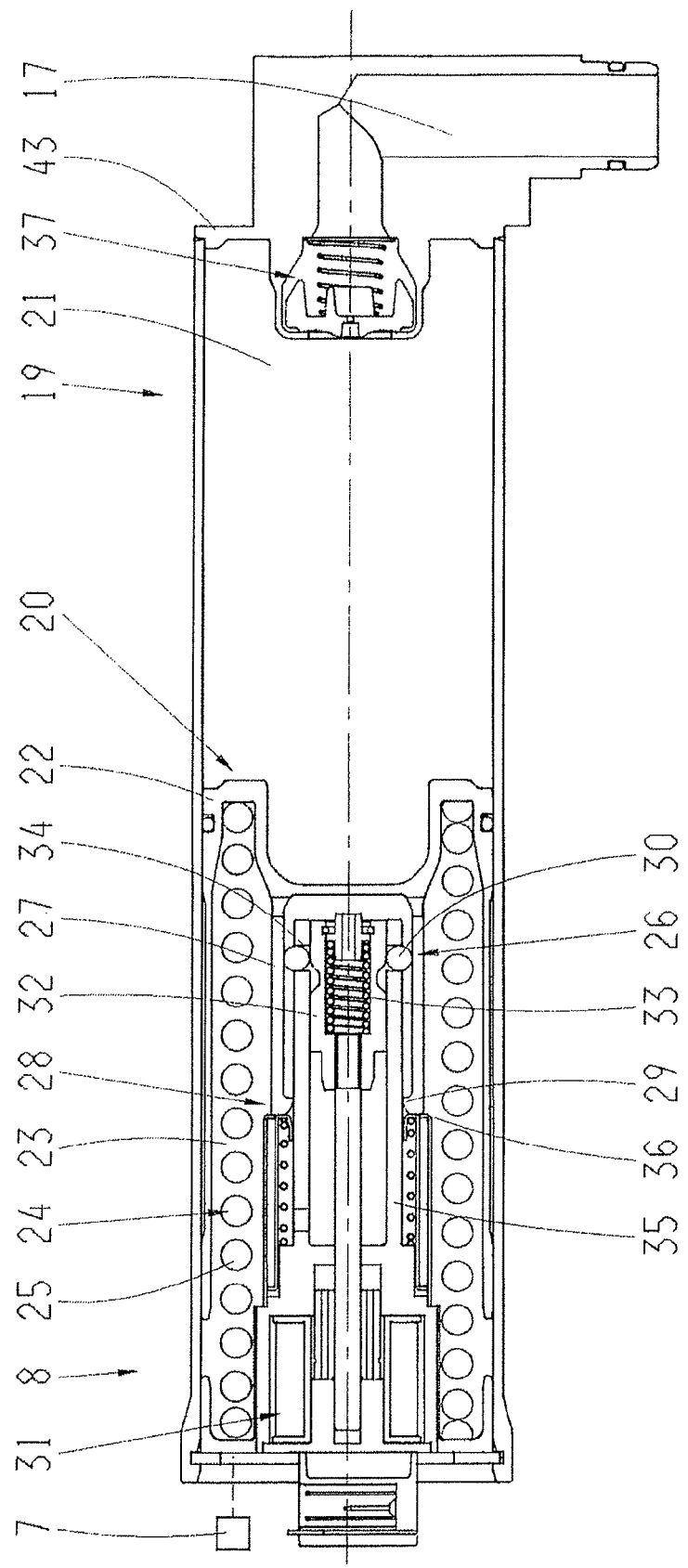
FIG. 5: The device according to FIG. 4, with the delimiting device in an operating condition equivalent to maximum volume of the storage chamber.

The energized condition of the electromagnetic actuator 31 and the activated condition of the holding device 26 are shown in FIGS. 4 and 5, in which the detent elements 30 are pushed radially outward through openings provided in a sleeve 35.

Above a defined pressure level inside the storage chamber 21 the piston element 22 is pushed progressively away from the intermediate position shown in FIG. 4 toward the second end position shown in FIG. 5, in which the storage chamber 21 has its maximum volume and is completely filled with hydraulic fluid. Starting from the axial position of the piston element 22 shown in FIG. 5, which is defined by a stop 36, the operating condition of the delimiting device 20 or the axial position of the piston element 22 when the holding device 26 is activated varies as a function of a pressure in the hydraulic system 6 or in the storage chamber 21 and, at the same time, as a function of the spring force of the spring arrangement 24 in an operating condition range between two limiting operating conditions, in which the volume of the storage chamber 21 is either a maximum or corresponds to the defined value of the storage chamber 21.

Accordingly, in a simple manner, when the holding device 26 is activated it is made possible for a hydraulic fluid volume stored in the storage chamber 21 additionally to the defined volume of the storage chamber 21, when the pressure in the storage chamber 21 or in the hydraulic system 6 falls below a defined value, by the action of the spring arrangement to expel the additional hydraulic fluid volume into the hydraulic system 6, and concomitantly to displace the piston element 22 starting from the second end position shown in FIG. 5 in the direction toward the axial position shown in FIG. 4 and equivalent to the defined volume of the storage chamber 21, so that the hydraulic fluid volume necessary for producing a required operating condition of the transmission device 3 can be provided even when the delivery power of the hydraulic pump 10 is insufficient, without having to expel from the device 8, a hydraulic fluid volume that must be reserved in the device 8 in order to be able to start the combustion engine 2.

This also means that when the hydraulic pressure in the storage chamber 21 falls because the motor start-stop function is active, the combustion engine 2 is off and the hydraulic pump 10 is accordingly no longer delivering, then when the pressure falls below a certain value, the piston element 22 is pushed by the spring arrangement 24 in the direction toward its first end position. If the holding device 26 is activated, the piston element 22 will be held by the holding device 26 in the intermediate position shown in FIG. 4.

Since the storage chamber 21 is connected, via a one-way throttle valve 37, to the hydraulic system 6, the device 8 can be supplied in a damped manner by the delivery hydraulic pump 10 via a hydraulic line 17 of the hydraulic system 6 of the transmission device 3 that carries the system pressure p_sys, which can for example be 15 bar or more. Thus, the components of the device 8 only have to be designed to withstand a filling pressure that can be adjusted by the one-way throttle valve 37 and is correspondingly low.

An additional result of having the one-way throttle valve 37 is that since the movement of the piston element 22 is slowed down by the one-way throttle valve 37, during the filling of the device 8, the system pressure p_sys of the hydraulic system 6 is not changed to an extent that adversely affects the action mode of the transmission device 3.

If the storage chamber 21 has its defined volume as shown in FIG. 4 and the combustion engine 2 is switched off by the motor start-stop function, then the piston element 22 is held by the holding device 26 in the intermediate position as shown in FIG. 4, whereby the filling pressure built up in the storage chamber 21 during the filling process of the storage chamber 21, when there is a corresponding pressure drop between the storage chamber 21 and the hydraulic system 6, decreases by virtue of the one-way throttle valve 37 and the hydraulic fluid volume stored in the storage chamber 21 is held therein in an essentially unpressurized condition. In a simple and inexpensive manner this avoids the need for complex and costly sealing means for the storage chamber 21.

However, in order to avoid draining of the storage chamber 21 when the combustion engine 2 is switched off and the hydraulic pump 10 is therefore not delivering, in a simple manner the device 8 must be arranged below the filling level of the oil sump 7 of the transmission device 3 since the storage chamber 21 will then remain completely full due to the hydrostatic pressure, without further design measures.

If a control system calls for the combustion engine 2 to be started, energizing of the electromagnetic actuator 31 is interrupted and the actuating tappet 32 is pushed by the further spring arrangement 33 to its position in which the holding device 26 is deactivated and in which the blocking elements 30 are disengaged from the detent area 29 of the piston element 22. At the same time the piston element 22 is pushed by the spring arrangement 24 in the direction toward its first end position and the defined hydraulic fluid volume stored in the storage chamber 21 is discharged toward the hydraulic system 16 via the open one-way throttle valve 37, which now has a considerably larger flow cross-section, to assist actuation of shifting elements such as shifting clutches or shifting brakes as well as the filling of a hydraulic control unit of the transmission 3.

FIGS. 6 to 13 show further embodiments of the device 8, each differing only in some areas from the embodiment shown in FIGS. 4 and 5, so that for the sake of clarity in the following description only the differences between the individual embodiments of the device 8 will be pointed out, while concerning the further action mode of the device 8 reference should be made to the description of FIGS. 4 and 5.

Figure 6:
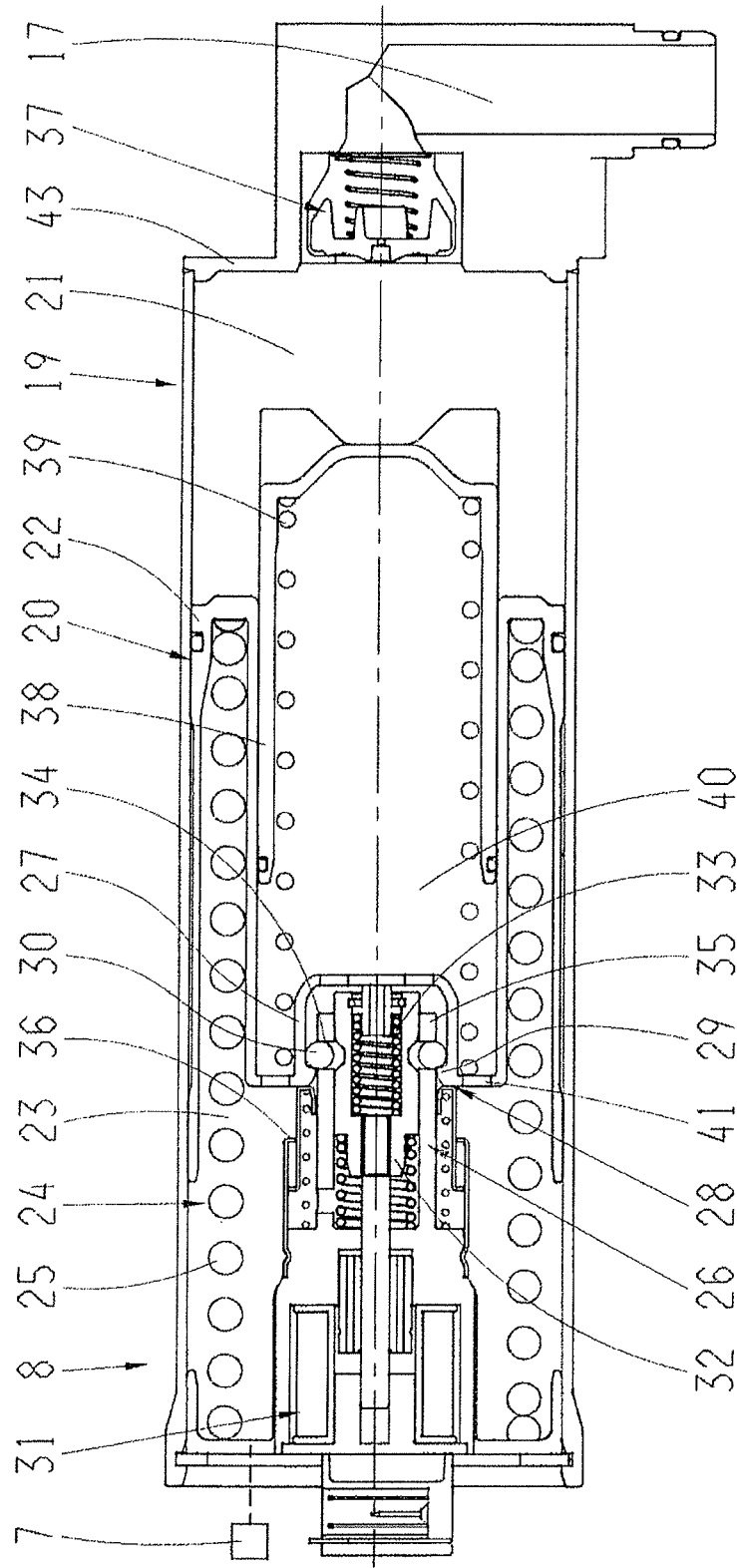
FIG. 6: A representation similar to FIG. 2, of a second example embodiment of the device according to the invention, whose delimiting device is formed with two piston elements arranged coaxially with one another.

In the area of the delimiting device 20, the second embodiment of the device 8 as shown in FIG. 6 is made with a further piston element 38 in addition to the piston element 22. Thus, the delimiting device 20 has two piston elements 22, 38, each movable against the spring force of a respective spring arrangement 24 or 39 in the housing assembly 19, in each case starting from a position equivalent to the minimum volume of the storage chamber 21 in the direction toward the maximum volume of the storage chamber 21. The piston elements 22 and 38 are positioned coaxially with one another and the piston element 38 is arranged at least in part to move longitudinally inside the outer (first) piston element 22. The outer piston element 22 can be held by the holding device 26 in the position that is equivalent to the defined volume of the storage chamber 21, against the spring force of the spring arrangement 24.

The spring characteristic of the spring arrangement 39 associated with the inner (second) piston element 38 is weaker than the spring characteristic of the spring arrangement 24 associated with the outer (first) piston element 22, so that a pressure-dependent response limit for axial movement of the inner (second) piston 38 is lower than the response limit of the outer (first) piston element 22. The spring arrangement 39 associated with the inner (second) piston element 38 is arranged inside the piston element 38 which is designed partially as a hollow cylinder, and rests against shoulders of the outer (first) piston element 22 and the inner (second) piston element 38.

The two piston elements 22 and 38 delimit a further storage chamber 40 that is separate from the storage chamber 21, which is functionally connected to the space 23 via a diaphragm aperture 41 in the outer (first) piston element 22. In this case the flow cross-section, which is defined by the diaphragm aperture 41 between the further storage chamber 40 and the space 23, is of size such that the inner (second) piston element 38 can be pushed into the outer piston element 22 with little force, so that the starting pulse or starting dynamics of the outer (first) piston element 22 during an expulsion process of the hydraulic fluid volume out of the storage chamber 21 toward the hydraulic system by the outer piston element is not impeded to any undesired extent by the inner (second) piston element 38, and the hydraulic fluid volume required during a starting process of the combustion engine 2 is ejected in the direction toward the hydraulic system 6.

In this case the further storage chamber 40 is not connected to the storage chamber 21, so the hydraulic fluid volume stored between the piston elements 22 and 38 in the device 8 cannot be delivered to the hydraulic system 6. Since the further storage chamber 40 is connected to the space 23 by way of the diaphragm aperture 41 and in turn the space 23 is connected to the oil sump 7, in the embodiment of the device 8 shown in FIG. 6 no oil volume passes, via the device 8, from the oil sump 7 into the hydraulic system 6, so there is no need for an oil sieve in this area.

Figure 7:
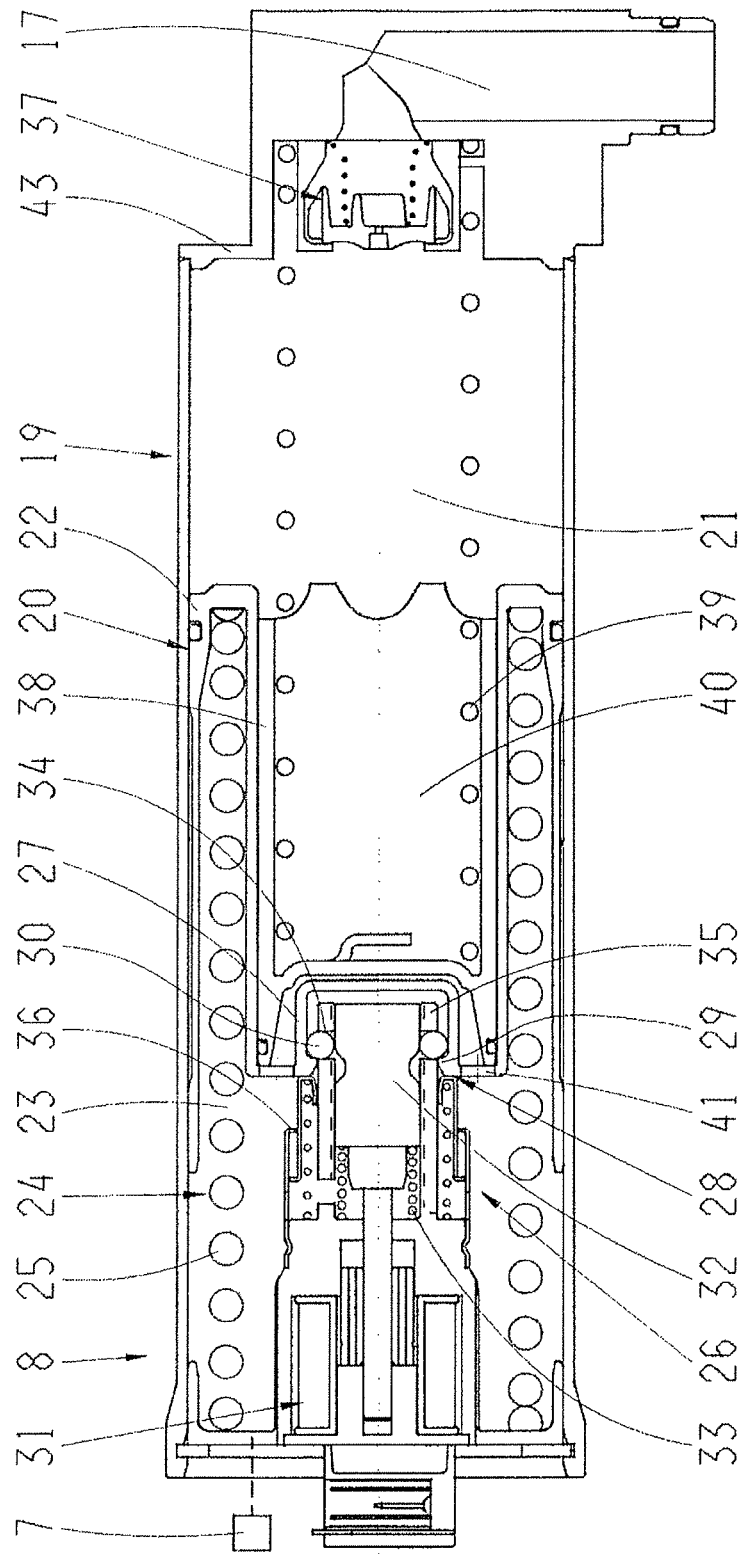
FIG. 7: A representation similar to FIG. 6, of a third example embodiment of the device according to the invention, in which a spring arrangement associated with one piston element of the delimiting device is in the form of a tension spring.

FIG. 7 shows a third example embodiment of the device 8, which corresponds essentially to the second example embodiment of the device 8 in FIG. 6. In the version of the device 8 as shown in FIG. 7, in contrast to the device 8 of FIG. 6 the spring arrangement 39 associated with the inner (second) piston element 38 is in the form of a tension spring and is supported between the inner (second) piston element 38 and the housing assembly 19, so that the inner (second) piston element 38 is axially independent of the outer (first) piston element 22.

Figure 8:
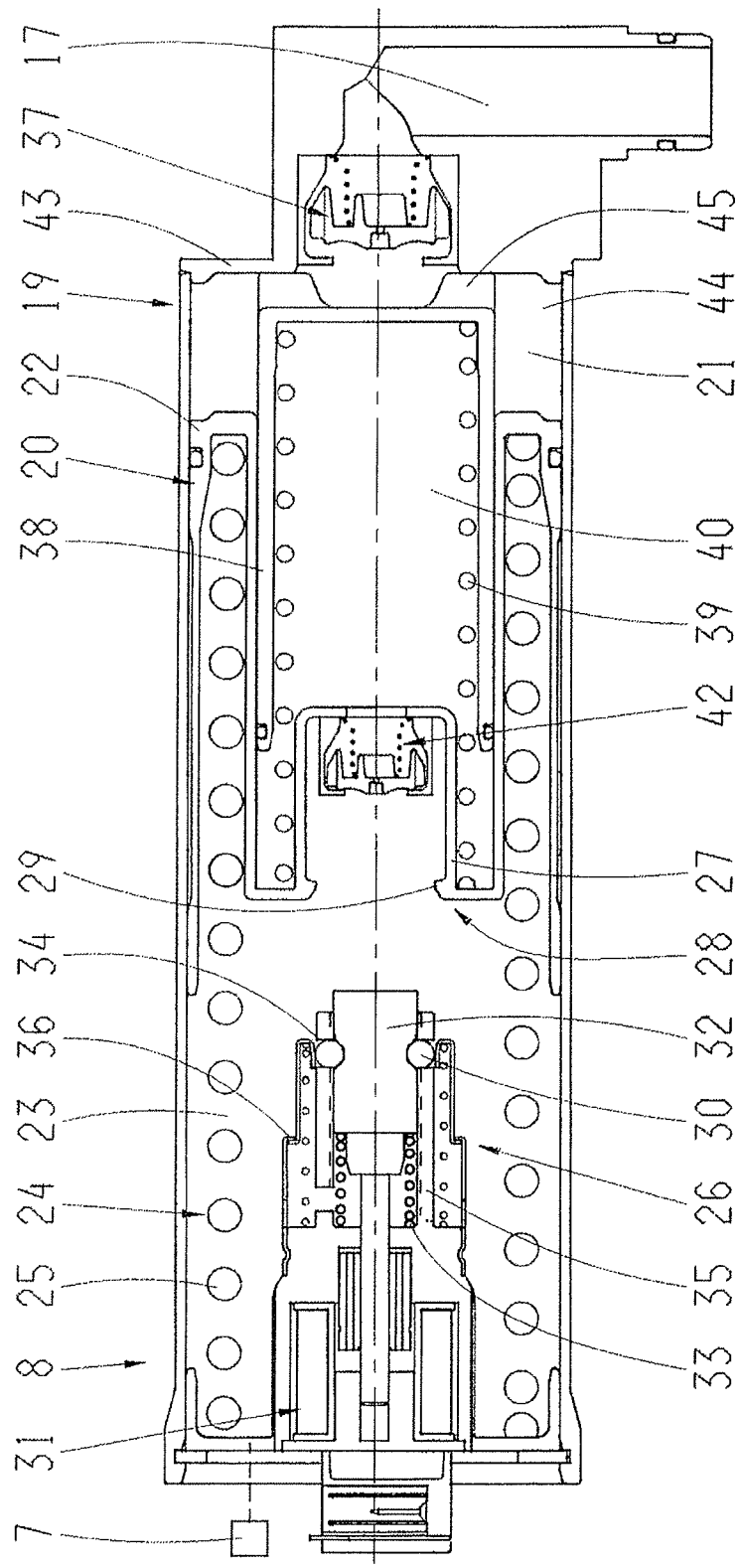
FIG. 8: A representation similar to FIG. 6, of a fourth example embodiment of the device according to the invention, wherein a storage chamber delimited by an outer piston element and an inner piston element of the delimiting device is connected via a valve unit to a hydraulic fluid reservoir.

The fourth embodiment of the device 8 shown in FIG. 8 is a further development of the second embodiment of the device 8 shown in FIG. 6, in which the further storage chamber 40, instead of via the diaphragm aperture 41, is functionally connected to the space 23 by way of a valve unit 42 in the form of a one-way throttle valve. By means of this valve unit 42 the discharge characteristic of the device 8 in FIG. 8 can be varied. That is to say, movement of the inner (second) piston element 38 starting from the stop 43 in the housing assembly 19 in the direction toward the holding device 26 can be adjusted as a function of the force that can be produced by virtue of the valve unit 42 and that acts additionally on the inner (second) piston element 38 during relative movement between the inner (second) piston element 38 and the outer (first) piston element 22. For example, the discharge characteristic can be adjusted in such manner that during a discharge process of hydraulic fluid from the device 8 by virtue of the outer (first) piston element 22, at first a larger volume and, with increasing axial displacement of the outer (first) piston element 22 starting from its position held by the holding device 26 in the direction toward its first end position, subsequently a smaller volume is discharged.

Alternatively to this, appropriate design of the valve unit 42 makes it possible at first to discharge a small volume and subsequently a larger volume. The discharge characteristic of the device 8 according to FIG. 8 also depends on the relative speed between the piston elements 22 and 38, and the movement of the inner (second) piston element 38 is additionally influenced by the spring characteristic of the spring arrangement 39 associated with the inner piston element 38 and by the internal pressure in the further storage chamber 40 that can be produced by means of the valve unit 42.

In general, by appropriate design of the inner (second) piston element 38 and/or of the housing assembly 19, it should be ensured that when the inner (second) piston element 38 is resting against the stop 43 of the housing assembly 19 while at the same time hydraulic fluid volume is being ejected from the device 8 by means of the outer piston element 22, an annular space 44 delimited by the housing assembly 19 and the inner (second) piston element 38 is not cut off from the inner (second) piston element 38 and from the hydraulic system 6 or the hydraulic line 17. This can be ensured, for example, by corresponding recesses 45 in the area of the inner (second) piston element 38 and/or in the area of the housing assembly 19.

FIGS. 9 to 13 show a fifth example embodiment of the device 8, which is again a further development of the embodiments of the device 8 shown in FIGS. 6 to 8. In this case the further storage chamber 40 can be connected to the space 23 by means of a path-controlled valve unit 46, and to the storage chamber 21 by means of a further, pressure-controlled valve unit 47, depending on the pressure present at the time in the further storage chamber 40. Since in the version of the device 8 shown in FIGS. 9 to 13 the hydraulic system 6 can be brought into functional connection with the oil sump 7 by means of the device 8, an oil sieve device is provided in the flow path between the oil sump 7 and the storage chamber 21, to prevent dirt particles from the oil sump 7 making their way into the power system of the hydraulic system 6.

Figure 9:
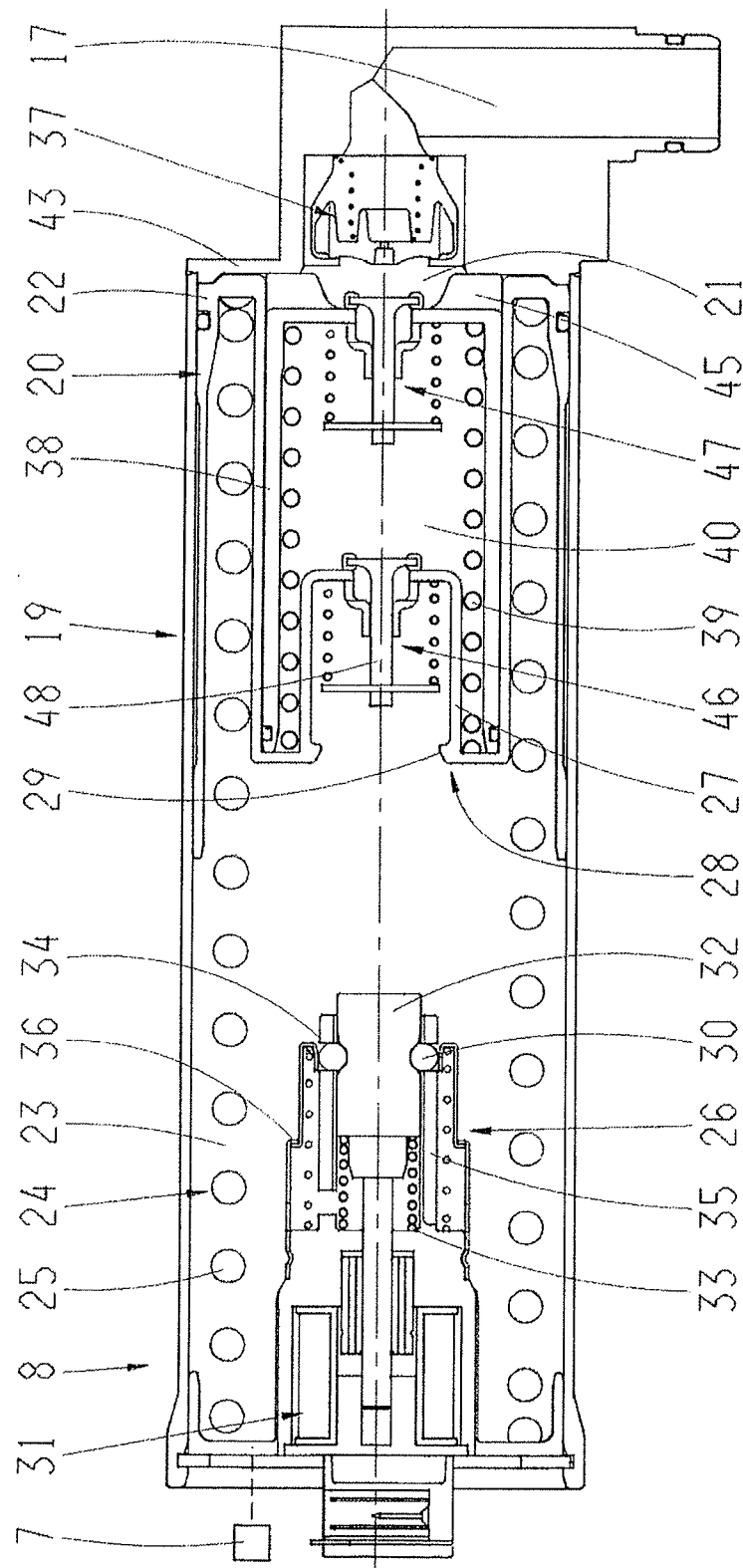
FIGS. 9 to 13: A fifth embodiment of the device according to the invention, represented as in FIG. 6 during various operating conditions of the device.
Figure 10:
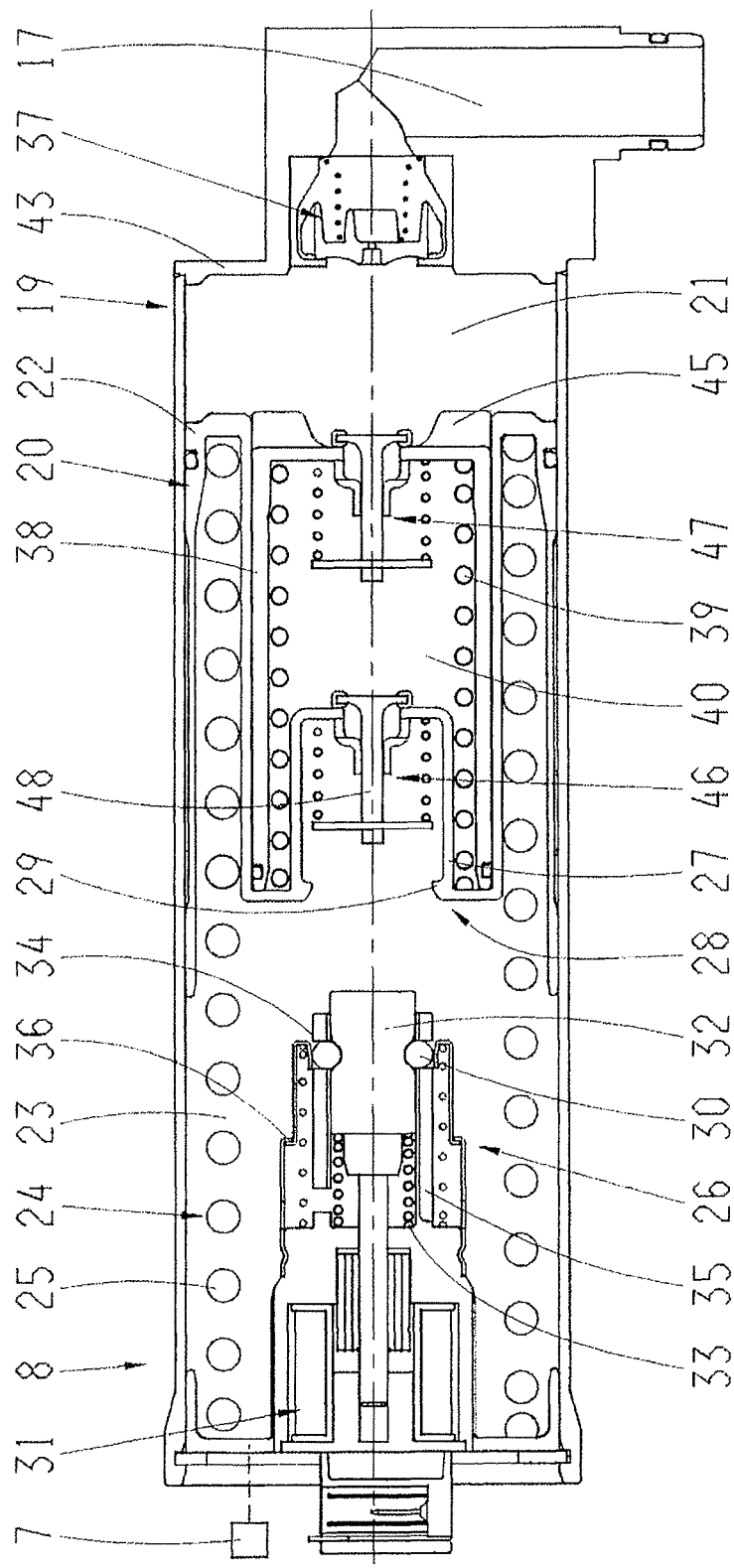

In the operating condition of the device 8 as shown in FIG. 9 the storage chamber 21 is fully discharged and has its minimum volume. As the running speed of the combustion engine 2 increases so that the delivery power of the hydraulic pump 10 increases as well, the system pressure $p\_sys$ in the hydraulic system 6 rises. As a result, from a defined pressure level of the system pressure $p\_sys$ and also as a function of the valve characteristic of the one-way throttle valve 37, the device 8 or its storage chamber 21 are filled. During this, starting from its first end position and in opposition to the spring force of the spring arrangement 24, the outer piston element 22 is pushed in the manner shown in FIG. 10 in the direction toward the holding device 26. During the filling process of the storage chamber 21, the inner (second) piston element 38 is pushed, in opposition to the spring force of the spring arrangement 39, all the way into the outer piston element 22 whereby both the connection between the further storage chamber 40 and the storage chamber 21, and also the connection between the further storage chamber 40 and the space 23, are blocked in the area of the valve units 46 and 47.

Figure 11:
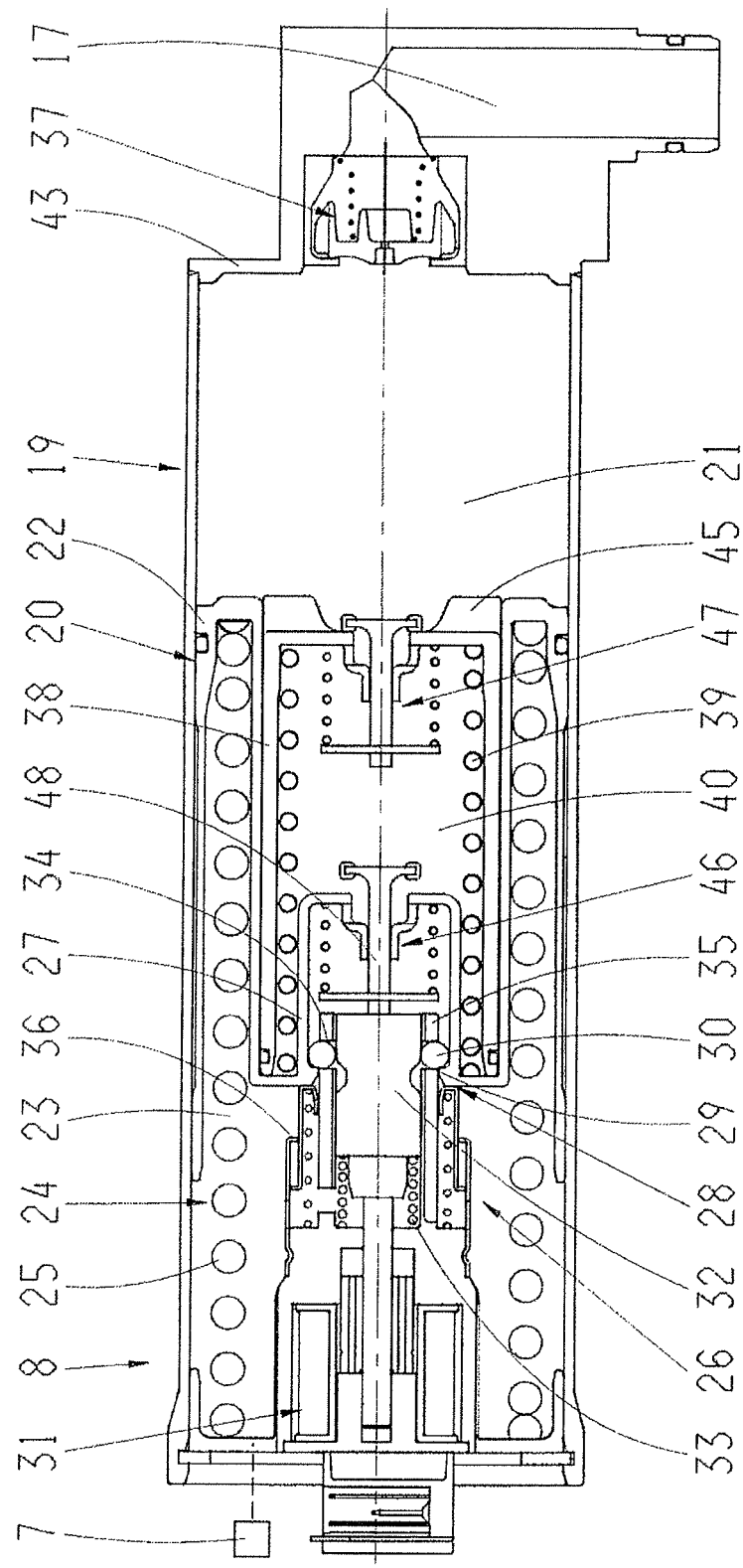

In the operating condition of the device 8 shown in FIG. 11, the device 8 is completely filled and the holding device 26 is activated. Due to contact of a valve tappet 48 with the actuating tappet 32 the valve unit 46 is opened, so that the further storage chamber 40 is functionally connected to the space 23 and hence to the oil sump 7. The outer piston element 22 is held by the holding device 26 in the axial position shown in FIG. 11, so that in any case the hydraulic fluid volume required for assisting a starting process of the combustion engine 2 is stored in the device 8 or its storage chamber 21. The inner (second) piston element 38, which in this case is not held by the holding device 26 in the position shown in FIG. 11, is held by the pressure present in the storage chamber 21, against the spring force of the spring arrangement 39, in the axial position shown. Thus, the hydraulic fluid volume stored in the device 8 can be discharged into the hydraulic system 6 during other system-critical operating conditions of the transmission device 3 as well, by means of an axial displacement of the inner (second) piston element 38 in the direction toward the stop 43.

Figure 12:
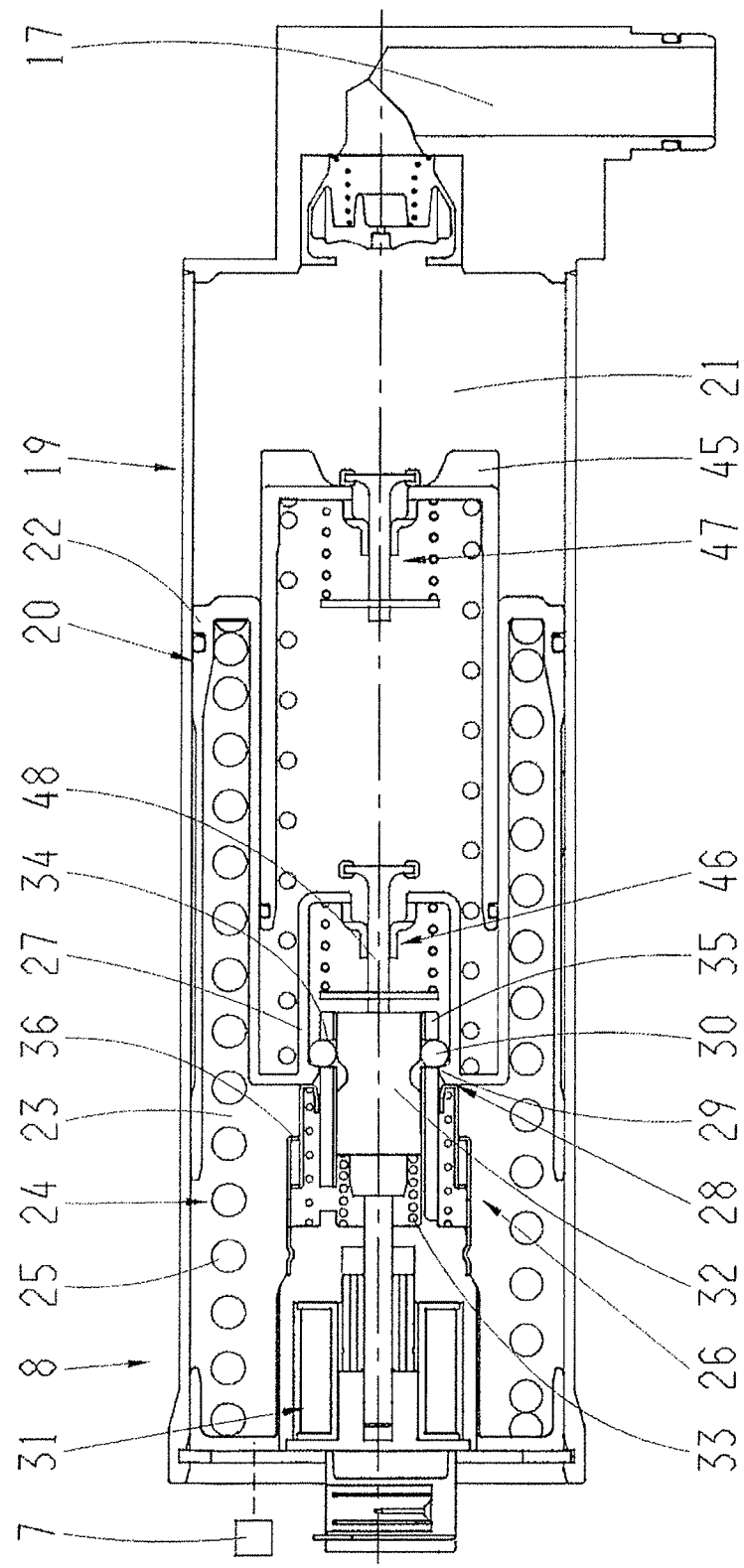

If the pressure in the storage chamber 21 falls below a defined pressure level, the outer piston element 22 is held by the activated holding device 26 against the spring force of the spring arrangement 24 in the position shown in FIG. 12, whereas the inner (second) piston element 38 is pushed by the spring 39 toward the stop 43 and a defined hydraulic fluid volume is expelled out of the storage chamber 21 in the direction toward the hydraulic system 6 via the one-way throttle valve 37. Since the valve unit 46 is still open, no under-pressure is produced in the further storage chamber 40 which could impede the relative movement between the inner (second) piston element 38 and the outer (first) piston element 22.

On the other hand, a renewed pressure build-up in the hydraulic system 6 and thus also in the storage chamber 21 causes the inner (second) piston element 38 to be again pushed in opposition to the spring arrangement 39 toward the holding device 26, until the storage chamber 21 reaches its maximum volume.

Figure 13:
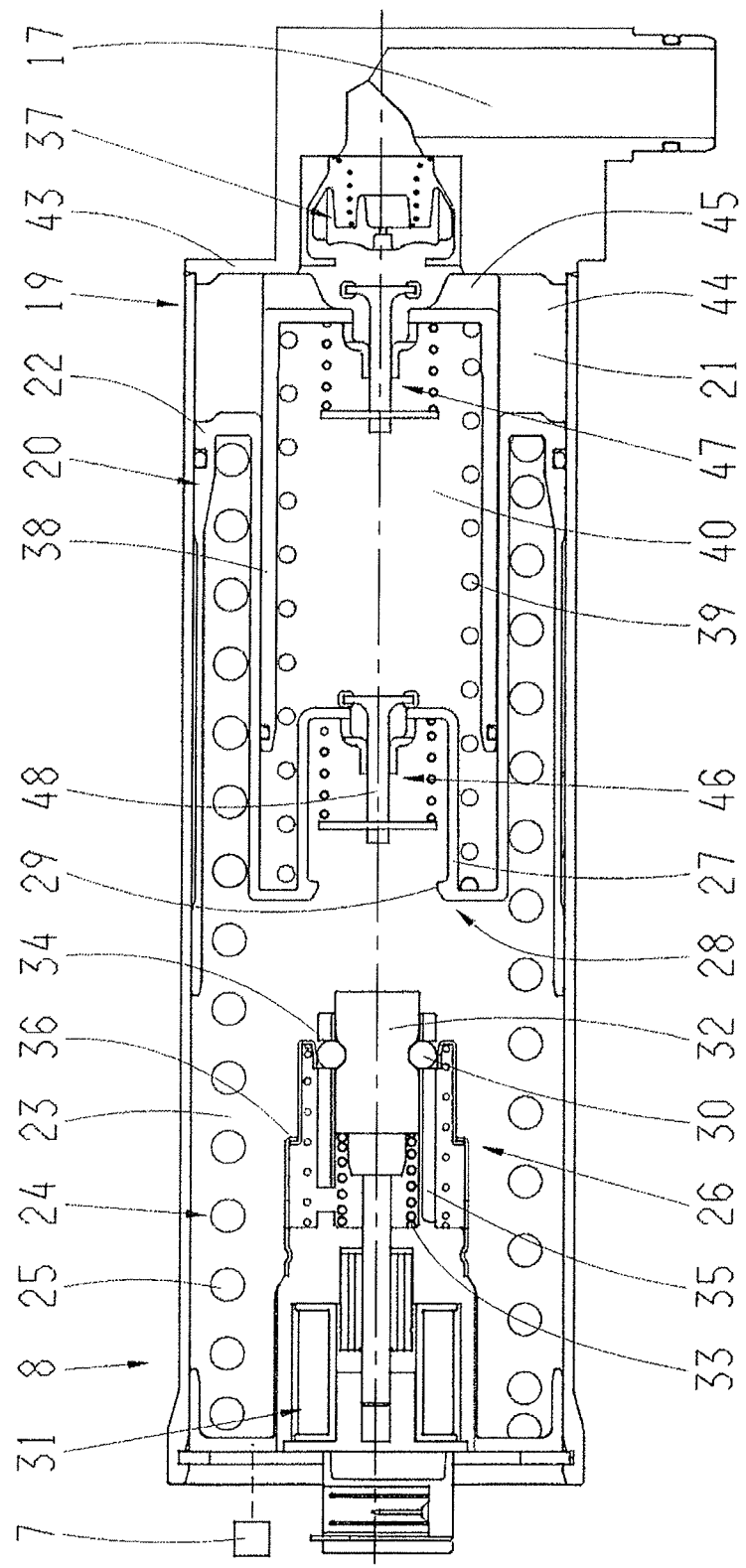

During the operating condition of the device 8 shown in FIG. 13 the holding device 26 is deactivated and the inner (second) piston element 38 is up against the stop 43, whereas the outer (first) piston element 22 is pushed by the spring arrangement 24 in the direction toward its first end position. In the axial position of the outer (first) piston element 22 shown in FIG. 13 the valve unit 46 is closed because the valve tappet 48 is lifted clear from the actuating tappet 32. Since the space 23 is connected to the oil sump 7, no under-pressure that could impede the ejection movement of the outer (first) piston element 22 is formed in the space 23 during the movement of the outer (first) piston element 22 in the direction toward the stop 43.

Due to the relative movement between the outer (first) piston element 22 and the inner (second) piston element 38, the pressure in the further storage chamber 40 increases to a pressure level at which the further valve unit 47 opens and besides the hydraulic fluid volume stored in the annular space 44, the hydraulic fluid volume stored in the further storage chamber 40 is expelled out of the device 8 and in the direction of the hydraulic system 6. In a simple manner this makes it possible to construct the device 8 with the same dimensions as the device known from the prior art and, both for a starting process of the combustion engine 2 and during other unfavorable operating conditions of the transmission device 3, in each case to discharge hydraulic fluid volume toward the hydraulic system 6, in each case without the supporting function during the starting process of the combustion engine 2, or during a supply-critical operating condition of the transmission device 3 different from that, being impaired by the respective other function.

Furthermore, it is advantageous that during the discharge process of the hydraulic fluid out of the device 8 during the starting process of the combustion engine 2, thanks to the arrangement of the inner (second) piston element 38 in combination with the further valve unit 47, no stored oil volume remains in the device 8 and, because the spring characteristic of the spring arrangement 39 is preferably lower compared with that of the spring arrangement 24, no oil volume is retained in the storage chamber 21 due to a corresponding movement of the inner (second) piston element 38.

In a further embodiment of the device according to the invention, not shown in the drawings, it is provided that the delimiting device is made with the outer (first) piston element and the inner (second) piston element. In addition, the outer piston element is mounted in a floating manner as described in relation to FIGS. 4 and 5, or mounted so that it can move in the axial direction beyond the detaining position of the holding device 26 in the housing assembly. When the holding device is activated, above a pressure level determined by the spring characteristic of the spring arrangement associated with the inner (second) piston element additional hydraulic fluid volume can be stored in the device 8 by virtue of axial movement of the outer (first) piston element between the position equivalent to the defined volume of the storage chamber and the position of the outer (first) piston element equivalent to the maximum volume of the storage chamber 21, and when the pressure falls below the level that, fluid can be discharged in the direction toward the hydraulic system 6.

Furthermore, with this embodiment of the device according to the invention it is possible, in a lower pressure range in the hydraulic system, by virtue of relative movement of the inner (second) piston element relative to the outer (first) piston element, for hydraulic fluid to be introduced into the hydraulic system and at the same time to store in the device the hydraulic fluid volume to be provided for the starting process of the combustion engine 2, so that this support of the hydraulic system with the hydraulic fluid can be achieved at a lower pressure level in the hydraulic system.

Figure 14:
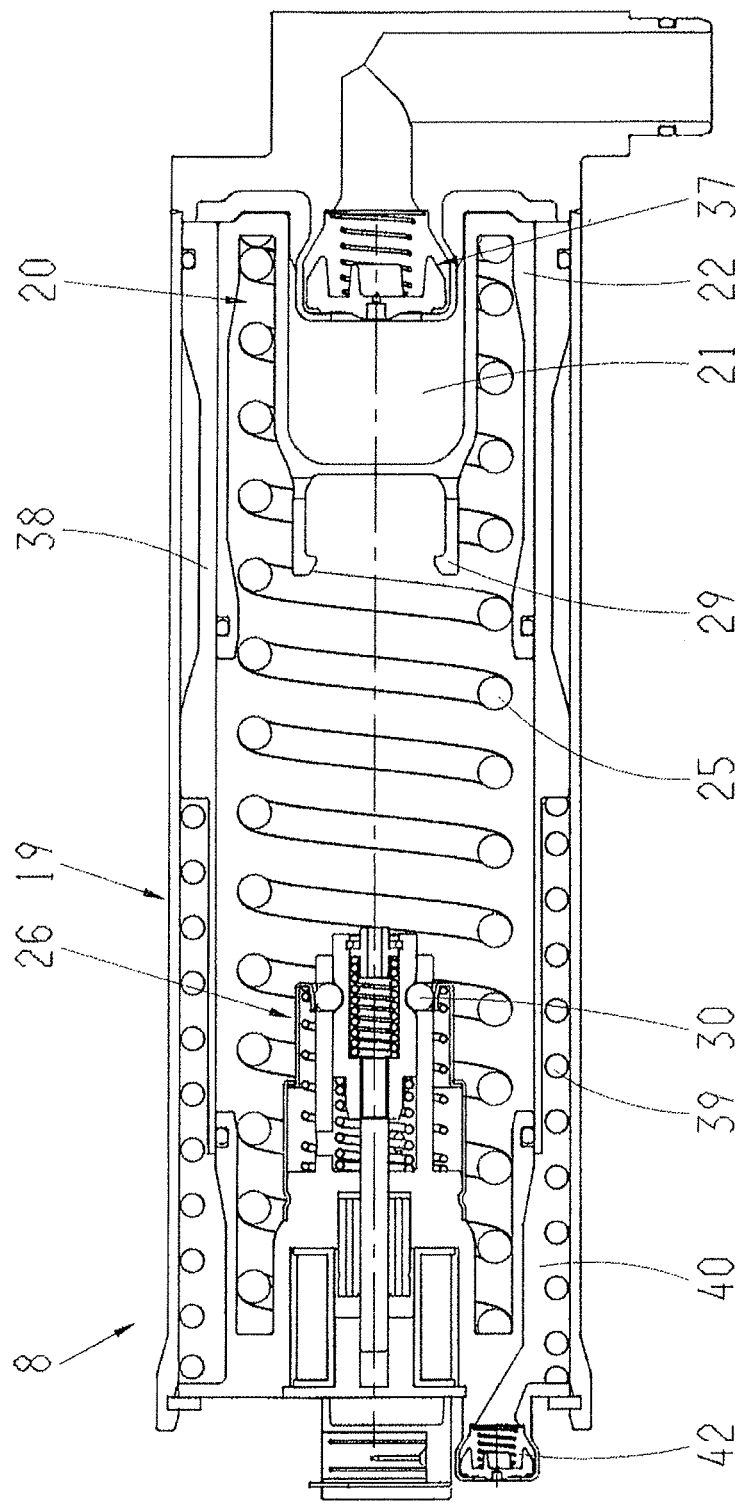
FIG. 14: A sixth example embodiment of the device according to the invention, derived from FIG. 8 but with a radially inverted arrangement of the two piston elements compared with FIG. 8.

The sixth example embodiment of the device 8 shown in FIG. 14 shows a storage system similar to that in FIG. 8. As before, the two piston elements 22, 38 are positioned coaxially with one another. However, the difference compared with FIG. 8 is that the first piston element 22, which with the help of its detent section 29 and the blocking element 30 of the holding device 26 can be detained axially, is this time arranged radially on the inside whereas the second piston element 38 which forms the further storage chamber 40 is now arranged radially on the outside. In contrast to the design shown in FIG. 8, in which the first piston element 22 that can be detained by the holding device 26 at least partially surrounds the second piston element 38 radially, in the sixth example embodiment of the device 8 shown in FIG. 14 the first piston element 22 that can be detained by the holding device 26 is thus arranged centrally, substantially inside the second piston element 38.

Thanks to this arrangement of the piston elements 22 and 38 more fitting space is available for the spring 39 associated with the piston element 38, which is advantageous for the design of this spring 39 in terms of its life, while the design of the spring 25 associated with the piston element 22 is unaffected.

Figure 15:
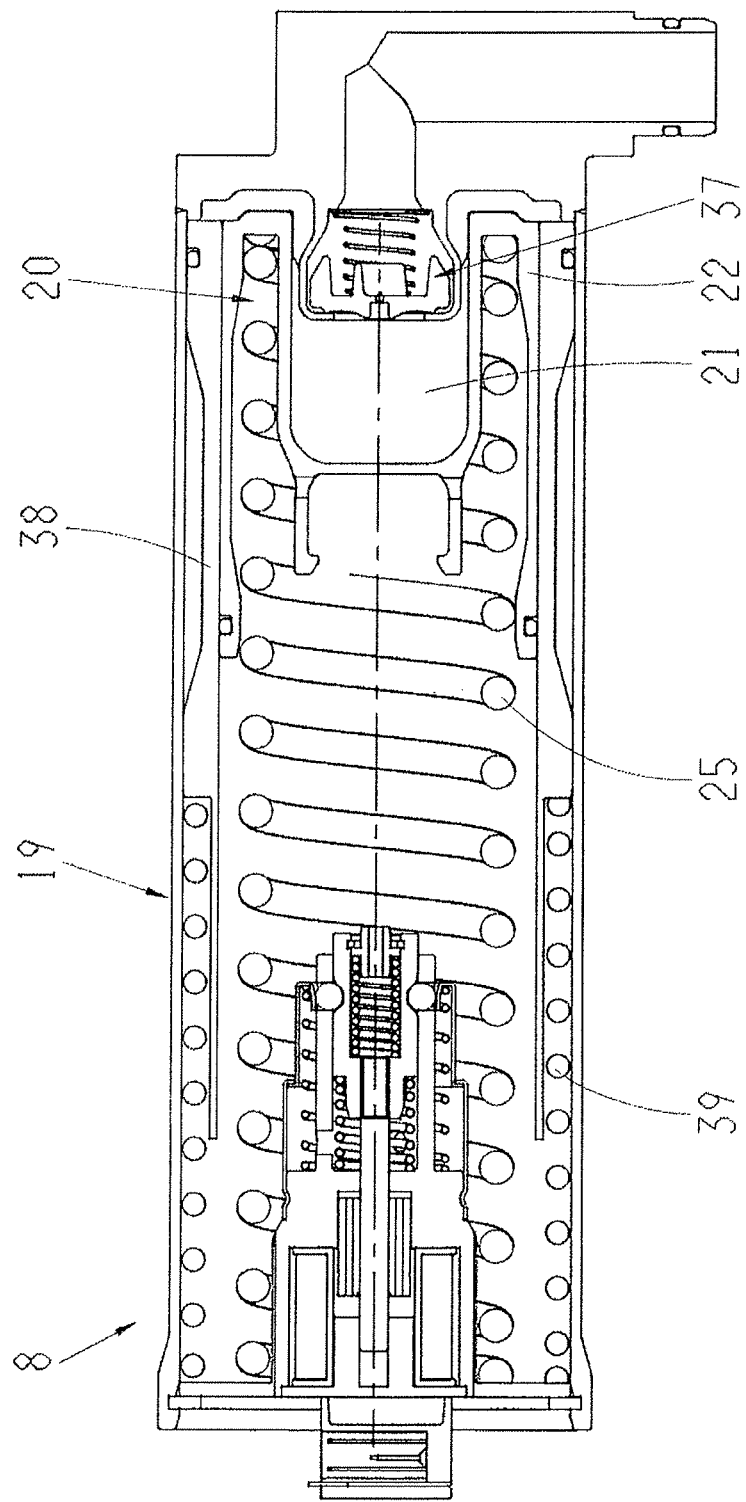
FIG. 15: A seventh example embodiment of the device according to the invention, derived from FIG. 14 but with a simplified design in comparison with FIG. 14.

FIG. 15 shows a seventh example embodiment of the device 8 derived from the storage system of FIG. 14. In contrast to the embodiment shown in FIG. 14, in this case the further storage chamber 40 and the valve unit (one-way throttle valve) 42 are omitted.

INDEXES

1 Vehicle
2 Internal combustion engine
3 Transmission device
4 Shifting element
5 Shifting element
6 Hydraulic system
7 Oil sump
8 Device
9 Hydraulic control unit
10 Hydraulic pump
11 Pressure side
12 System pressure valve
13 Spring arrangement
14 Valve slide
15 Restoring surface
16 Primary pressure circuit
17 Hydraulic line
18 Blocking valve 19 Housing assembly
20 Delimiting device
21 Storage chamber
22 First piston element
23 Space
24 Spring arrangement
25 Spring element
26 Holding device
27 Holding section
28 End area
29 Detent area
30 Blocking element
31 Electromagnetic actuator
32 Actuating tappet
33 Further spring arrangement
34 Opening
35 Sleeve
36 Stop
37 One-way throttle valve
38 Second piston element
39 Spring arrangement
40 Further storage space
41 Diaphragm cross-section
42 Valve unit
43 Stop
44 Annular space
45 Recess
46 Valve unit
47 Valve unit
48 Valve tappet
50 Secondary pressure circuit
p_mod Modulation pressure
p_sek Secondary pres
p_sys System pressure

The invention claimed is:

1. A device (8) for storing hydraulic fluid of a hydraulic system (6) of a transmission device, the device (8) comprising:
at least one storage chamber (21) being delimited by a housing assembly (19) and a delimiting device (20) and being functionally connectable with the hydraulic system (6) for an exchange of hydraulic fluid, the housing assembly having a continuous wall,
a volume of the storage chamber (21) being variable between a minimum volume and a maximum volume as a function of an operating condition of the at least one of the delimiting device (20) and the housing assembly (19),
at least one of the delimiting device (20) and the housing assembly (19) being detainable, by a holding device (26), in an operating condition equivalent to a defined value of the volume of the storage chamber (21) in opposition to a restoring effort of the at least one of the housing assembly (19),
the delimiting device (20), starting from an operating condition which differs from the operating condition equivalent to the minimum volume of the storage chamber (21), in a direction toward an operating condition equivalent to the minimum volume of the storage chamber (21),
the operating conditions of at least one of the delimiting device (20) and the housing assembly (19), when the holding device (26) is activated, varying as a function of a pressure in the hydraulic system (6) and of their restoring efforts, respectively within an operating condition range between two limiting operating conditions in which the volume of the storage chamber (21) is either a maximum, or corresponds to the defined value of the volume of the storage chamber (21), and
the delimiting device (20) comprises two piston elements (22, 38) that are movable in the housing assembly (19) each in opposition to a spring force of a respective spring arrangement (24, 39), in each case starting from a position equivalent to the minimum volume of the storage chamber (21), in the direction toward the maximum volume of the storage chamber (21), such that at least one of the two piston elements (22) is detainable by the holding device (26) in the position equivalent to the defined value of the volume of the storage chamber (21), against the spring force of the spring arrangement (24).

2. The device according to claim 1, wherein the delimiting device (20) comprises a piston element (22) that is movable in the housing assembly (19) in opposition to a spring force of a spring arrangement (24), starting from a position equivalent to the minimum volume of the storage chamber (21), in the direction toward the maximum volume of the storage chamber (21), and the piston element (22) is detainable by the holding device (26) in a position equivalent to the defined value of the volume of the storage chamber (21) against the spring force of the spring arrangement (24).

3. The device according to claim 1, wherein the two piston elements (22, 38) are positioned coaxially with respect to one another, and a first of the two piston elements is arranged and able to move longitudinally at least partially inside a second of the two piston elements.

4. The device according to claim 3, wherein the second piston element (38) is at least partially formed at least approximately as a hollow cylinder.

5. The device according to claim 3, wherein a further storage chamber, delimited by the first piston element (22) and the second piston element (38) and separate from the storage chamber (40), is connectable to a hydraulic fluid reservoir (7) by a valve unit (42; 46).

6. The device according to claim 5, wherein the valve unit (42) is a one-way throttle valve has a cross-sectional flow, between the further storage chamber (40) and the hydraulic fluid reservoir (7), which varies as a function of a pressure in the further storage chamber (40).

7. The device according to claim 5, wherein at least from the position of the first piston element (22) equivalent to the defined volume of the storage chamber (21), the further storage chamber (40) is connected to the hydraulic fluid reservoir (7) by the valve unit (46), and in positions of the first piston element (22) equivalent to storage volumes of the storage chamber (21) that are smaller than the defined volume of the storage chamber (21), the further storage chamber (40) is cut off from the hydraulic fluid reservoir (7).

8. The device according to claim 5, wherein the further storage chamber (40) is connectable to the storage chamber (21) by a further valve unit (47).

9. The device according to claim 8, wherein the further valve unit (47) is a one-way valve with defined response limits and, if a defined pressure level is exceeded in the further storage chamber (40), the further valve unit (47) connects the further storage chamber (40) to the storage chamber (21).

10. The device according to claim 1, wherein the storage chamber (21) is connected to the hydraulic system (6) by a one-way throttle valve (37) and, if pressure in the hydraulic system (6) is such that the storage chamber (21) is filled with hydraulic fluid in opposition to the restoring effort of at least one of the housing assembly (19) and the delimiting device (20), the one-way throttle valve (37) leaves open a smaller flow cross-section than if the pressure in the hydraulic system (6) is such that by virtue of the restoring effort of the at least one of the housing assembly (19) and the delimiting device (20), hydraulic fluid is being discharged out of the storage chamber (21) in the direction toward the hydraulic system (6).

11. The device according to claim 1, wherein a switchable blocking valve (18) is provided between the storage chamber (21) and the hydraulic system (6).

12. A device (8) for storing hydraulic fluid of a hydraulic system (6) of a transmission device, the device (8) comprising:
- at least one storage chamber (21) being delimited by a housing assembly (19) and a delimiting device (20) and being functionally connectable with the hydraulic system (6) for an exchange of hydraulic fluid, the housing assembly having a continuous cylindrical wall;
- a volume of the storage chamber (21) being variable between a minimum volume and a maximum volume as a function of an operating condition of the at least one of the delimiting device (20) and the housing assembly (19);
- at least one of the delimiting device (20) and the housing assembly (19) being detainable, by a holding device (26), in an operating condition equivalent to a defined value of the volume of the storage chamber (21) in opposition to a restoring effort of the at least one of the housing assembly (19);
- the delimiting device (20), starting from an operating condition which differs from the operating condition equivalent to the minimum volume of the storage chamber (21), in a direction toward an operating condition equivalent to the minimum volume of the storage chamber (21);
- the operating conditions of at least one of the delimiting device (20) and the housing assembly (19), when the holding device (26) is activated, varying as a function of a pressure in the hydraulic system (6) and of their restoring efforts, respectively within an operating condition range between two limiting operating conditions in which the volume of the storage chamber (21) is either a maximum, or corresponds to the defined value of the volume of the storage chamber (21);
- the delimiting device (20) comprises two piston elements (22, 38) that are movable in the housing assembly (19) each in opposition to a spring force of a respective spring arrangement (24, 39), in each case starting from a position equivalent to the minimum volume of the storage chamber (21), in the direction toward the maximum volume of the storage chamber (21), such that at least one of the two piston elements (22) is detainable by the holding device (26) in the position equivalent to the defined value of the volume of the storage chamber (21), against the spring force of the spring arrangement (24);
- the two piston elements (22, 38) are positioned coaxially with respect to one another, and a first of the two piston elements is arranged and able to move longitudinally at least partially inside a second of the two piston elements; and
- the first piston element (22) radially surrounds, at least partially, the second piston element (38), and the first piston element (22) is detainable by the holding device (26).

13. The device according to claim 3, wherein the first piston element (22) is arranged substantially centrally within the second piston element (38), and the first piston element (22) is detainable by the holding device (26).

14. The device according to claim 3, wherein the first piston element (22) and the second piston element (38) are acted upon by a spring force of a respective spring arrangement (24, 39) acting a position of the first and the second piston elements (22, 38) equivalent to the minimum volume of the storage chamber (21), and a spring characteristic of the spring arrangement (39) associated with the second piston element (38) is smaller than a spring characteristic of the spring arrangement (24) associated with the first piston element (22).

15. The device according to claim 14, wherein the first piston element (22) is supported against the housing assembly (19) by the spring arrangement associated with the first piston element (24).

16. The device according to claim 14, wherein the second piston element (38) is one of supported against the first piston element (22) or the housing assembly (19) by its associated spring arrangement (39).

17. A storage device for storing hydraulic fluid of a hydraulic system of a transmission device, the storage device comprising:
- a housing assembly having first and second axially opposed ends and an axially extending continuous cylindrical wall, a delimiting device being axially slidable within the housing assembly and with respect to the first and the second ends of the housing assembly, the delimiting device and the first axial end of the housing defining a storage chamber within the housing assembly, and the storage chamber communicates with the hydraulic system such that hydraulic fluid is transferrable therebetween;
- a spring element abutting the second end of the housing assembly and the delimiting device to apply a restoring force on the delimiting device that is axially directed toward the first end of the housing assembly;
- a holding device is fixed within the housing assembly to the second end of the housing assembly, the holding device engages an axial end of the delimiting device that faces the second end of the housing assembly so as to secure the delimiting device with respect to the second end of the housing assembly in opposition to the restoring force;
- the restoring force biases the delimiting device to a first position in which a volume of the storage chamber is at a minimum volume and relates to one operating condition of the delimiting device and the holding device securing the delimiting device in a second position in which the volume of the storage chamber is greater than the minimum volume and relates to another operating condition of the delimiting device;
- the volume of the storage chamber being adjustable depending on a pressure in the hydraulic system.

* * * * *